2,824,042

COMPOSITION FOR PREPARATION OF BUROW'S SOLUTION

Walter G. Gibbons, Greenvale, James P. Jones, Flushing, William A. Messner, Bronx, and Marvin Weiss, Jackson Heights, N. Y.

No Drawing. Application June 18, 1954
Serial No. 437,872

11 Claims. (Cl. 167—58)

This invention relates to a new composition of matter adapted for pharmaceutical use. More specifically, it involves a new composition from which a stable Burow's solution is simply prepared.

At the present time Burow's solution is made in several ways. The official U. S. P. procedure involves the reaction of aluminum sulfate, calcium carbonate and acetic acid to form aluminum sub-acetate, also termed basic aluminum acetate, and a precipitate of calcium sulfate; on removal of the calcium sulfate by filtration, the filtrate is converted to aluminum acetate solution, more commonly called Burow's solution, by the addition of acetic acid. A second approved procedure involves a double decomposition reaction of aluminum sulfate with either lead acetate or calcium acetate to produce a solution of aluminum acetate and a precipitate of lead or calcium sulfate. Filtration of the reaction mixture gives Burow's solution. The dry mix presently on the market comprises calcium acetate and aluminum sulfate.

Both the official U. S. P. procedure and the double decomposition method have the disadvantage of requiring filtration of a solid precipitate in the manufacture of Burow's solution. The dry mix modification has the additional disadvantage that it precipitates a more basic aluminum salt on standing because of the absence of any free acetic acid and the presence of soluble $CaSO_4$. Accordingly, aluminum acetate solution prepared from a dry mix becomes continuously less potent on standing or on heating. This invention provides a composition from which a Burow's solution stable to storage or heat is prepared without the necessity of a filtration step.

The composition of the invention comprises a mixture of an alkali metal acetate, acetic acid and a dibasic aluminum acetate stabilized with boric acid. Addition of water to this dry free-flowing powder mixture produces a U. S. P. Burow's solution which does not lose its potency on prolonged storage or heating. This invention also contemplates the addition of a water soluble solid germicide and/or deodorant to the alkali metal acetate-acetic acid-dibasic aluminum acetate-boric acid mixture. The addition of water to the germicide-alkali metal acetate-acetic acid-boric acid mixture produces a Burow's solution possessing both therapeutic and germicidal properties.

The composition of this invention has two main advantages over prior art mixtures in the preparation of Burow's solution. The first advantage resides in the elimination of the troublesome filtration step and the extra equipment required therefor.

The second advantage is that the dry mix of this invention, unlike other dry mixes, gives a stable Burow's solution which retains its strength on standing or heating. The solution obtained with the mixture of this invention is completely stable without the addition of increments of acetic acid and does not precipitate a more basic aluminum salt even on prolonged heating or storage.

It has been found that the alkali metal acetates are capable of absorbing acetic acid and still remain as a dry free-flowing powder, the general formula of which is $CH_3COOX \cdot nCH_3COOH$ in which X represents an alkali metal such as sodium, potassium or lithium, and $n$ represents an integer from 1 to 4 or a fraction thereof. In addition, it has been found that the dibasic aluminum acetate is capable of absorbing acetic acid and still remain as a dry free-flowing powder, the general formula of which is $CH_3COO \cdot Al(OH)_2 \cdot nCH_3COOH$ wherein $n$ is a fraction. The required amount of acetic acid for the formation of aluminum acetate is usually incorporated either in the alkali metal acetate or in a mixture of the alkali metal acetate and the dibasic aluminum acetate. It may be incorporated either in the dry powder or powders or it may be incorporated in a low-boiling solvent miscible with acetic acid but immiscible with the dry powders. Such a solvent may be a naphtha fraction (such as benzin) or a chlorinated hydrocarbon such as carbon tetrachloride, although this invention is not limited to these two classes of solvents. After the acetic acid is incorporated in the suspended powders, the solvent is then removed by evaporation. In all cases when the proper proportion of the proper admixture is dissolved in water, it will react in accordance with well established rules of chemistry to form a solution of aluminum acetate U. S. P.

The anhydrous forms of the alkali metal acetates or diacetates are preferred because they contain the higher percentages of acetic acid although the hydrated salts are not excluded. While lithium and potassium acetates may be employed, sodium acetate is preferred because of cost and availability.

The dibasic aluminum acetate employed has the following formula $CH_3COO \cdot Al(OH)_2 \cdot 1/3 H_3BO_3$. The boric acid in this product is held in loose combination and amounts to approximately 10–12% by weight. The presence of borate ion and small amounts of sodium ion in the Burow's solution obtained by the addition of water to the sodium acetate-acetic acid-dibasic aluminum acetate-boric acid mixture acts as a stabilizer and buffer.

The mutual effectiveness of borate ion and sodium ion in counteracting such deleterious influences as alkaline glass containers or wide variations in pH of waters of different localities may well account for the unusual stability of the Burow's solution prepared from the composition of this invention. Under prolonged storage at elevated temperatures U. S. P. Burow's solution prepared in the conventional manner soon develops a decided precipitate, while solutions prepared from the composition of this invention remain clear.

The pertinent requirements of aluminum acetate solution U. S. P. are that it shall contain in each 100 cc., 1.325 grams ±9.5% of $Al_2O_3$; 4.675 grams ± 9.5% of acetic acid and not more than 0.6 gram of boric acid, and shall have a pH of approximately 4. Therefore the various components of this invention must be mixed in such proportion to comply with these constants. For example, dibasic aluminum acetate contains 35.5–37% of $Al_2O_3$, 43% of acetic acid and 10–12% of boric acid. A weight of 3.7 grams of this dibasic aluminum acetate will supply the correct amount of 1.325 grams of $Al_2O_3$ but only 1.59 grams of acetic acid. In order to comply with the U. S. P. specifications, it is necessary to supply an additional 3.07 grams of acetic acid. This acetic acid may be supplied by any of the following means: sodium diacetate alone; sodium diacetate or sodium acetate treated with acetic acid to form higher acetic acid-acetates; a portion of the acetic acid may be added to the dibasic aluminum acetate; the acetic acid may be added to a mixture of the dry ingredients or to a suspension of the ingredients in a solvent miscible with acetic acid, but immiscible with the powders.

Thus typical formulations may be written as follows:

|     |                          | Grams |
| --- | ------------------------ | ----- |
| (1) | Dibasic aluminum acetate | 3.7   |
|     | Sodium diacetate         | 3.7   |
| (2) | Dibasic aluminum acetate | 3.7   |
|     | Sodium acetate           | 2.1   |
|     | Acetic acid              | 1.5   |
| (3) | Dibasic aluminum acetate | 3.7   |
|     | Sodium diacetate         | 2.3   |
|     | Acetic acid              | 1.4   |
| (4) | Dibasic aluminum acetate | 3.7   |
|     | Sodium acetate           | 1.4   |
|     | Acetic acid              | 2.1   |
| (5) | Dibasic aluminum acetate | 3.7   |
|     | Acetic acid              | 1.0   |
|     | Sodium diacetate         | 1.7   |
|     | Acetic acid              | 0.7   |

In formulation 5, the 1.0 gram of acetic acid is incorporated in the aluminum acetate powder and the 0.7 gram is incorporated in the sodium diacetate powder; the two acetic acid-containing powders are then mixed.

The use of a low boiling solvent in preparation of the composition of the invention can be illustrated by reference to formulation 2 above. 3.7 grams of dibasic aluminum acetate and 2.1 grams of sodium acetate are suspended in 12 cc. of light naphtha to which 1.5 grams of acetic acid is then added. On evaporation of the light naphtha, a dry powder of the composition shown above is obtained.

Each of the above formulations, when dissolved in enough water to make 100 cc., gives a stable Burow's solution with a pH range of 4.2–4.7. It is, of course, possible to vary the ingredients in other ways, but in all cases the sum of the variations comply with all the specifications of the United States Pharmacopeia.

The water-soluble germicides which are advantageously added to the acetic acid-acetate-basic aluminum acetate compositions of this invention are either quaternary ammonium compounds or phenylmercuric salts. The quaternary ammonium compounds are preferred adjuvants for imparting germicidal and deodorant properties to the Burow's solution.

Quaternary ammonium compounds that may be used are the following: cetal pyridinium chloride, lauryl pyridinium chloride; (di-isobutylphenoxy ethoxyethyl) dimethyl benzyl ammonium chloride monohydrate, sold by Rohm and Haas as Hyamine 1622; (di-isobutylcresoxy ethoxyethyl) dimethyl benzyl ammonium chloride monohydrate, sold by Rohm and Haas as Hyamine 10-X; a $C_8$ to $C_{18}$ alkyl dimethyl-3,4-dichlorobenzyl ammonium chloride sold as a Purasan DC by Gallowher Chemical Corp.; a $C_8$ to $C_{18}$ alkyl dimethyl benzyl ammonium chloride sold by Gallowher as Purasan AD and by Onyx Oil & Chemical Co. as BTC; and benzyltrimethylammonium chloride. All of these aforementioned quaternary ammonium compounds are water soluble and are compatible with the alkali metal acetate-acetic acid-aluminum acetate mixture. The resulting four-component mixtures are free flowing and readily soluble in water to give a therapeutic, germicidal and deodorant solution.

The phenyl mercuric salts are not as readily soluble as the quaternary ammonium compounds but they also are combined with acetic acid, alkali metal acetate and basic aluminum acetate to give a powder whose aqueous solution possesses therapeutic, germicidal and deodorant properties. Examples of this class are phenylmercuric nitrate, phenylmercuric borate and phenylmercuric acetate.

In the four-component mixtures comprising water-soluble germicide, alkali metal acetate, acetic acid and basic aluminum acetate, the germicide component normally comprises 0.4 to 6.0 weight percent of the total solid mixture. If a quaternary ammonium compound is used, the concentration is usually in the upper portion of the prescribed range, that is, in the neighborhood of 4.0% because of its greater and more rapid solubility. If the phenylmercuric solids are employed, the concentration of germicide is usually in the lower portion of the prescribed range, that is, in the neighborhood of 1.0%.

Obviously, many modifications and variations of the invention, as hereinbefore set forth, may be made without departing from the spirit and scope thereof, and therefore only such limitations should be imposed as are indicated in the appended claims.

We claim:

1. A pharmaceutical composition comprising dibasic aluminum acetate stabilized with boric acid, acetic acid and an alkali metal acetate.

2. The pharmaceutical composition of claim 1 in which the boric acid comprises 10–12% by weight of said basic aluminum acetate.

3. The pharmaceutical composition of claim 1 in which the alkali metal acetate is sodium acetate.

4. The pharmaceutical composition of claim 1 in which the alkali metal acetate is sodium diacetate.

5. The pharmaceutical composition of claim 1 comprising 3.7 parts of dibasic aluminum acetate, 2.1 parts of anhydrous sodium acetate and 1.5 parts of acetic acid.

6. The pharmaceutical composition of claim 1 comprising 3.7 parts by weight of dibasic aluminum acetate, 2.3 parts by weight of sodium diacetate and 1.4 parts by weight of acetic acid.

7. The pharmaceutical composition of claim 1 comprising equal parts by weight of dibasic aluminum acetate and sodium diacetate.

8. A pharmaceutical composition comprising dibasic aluminum acetate stabilized with boric acid, acetic acid and an alkali metal acetate and a water soluble, non-irritating germicide selected from the group consisting of quaternary ammonium chloride compounds and phenylmercuric salts.

9. The pharmaceutical composition of claim 8 in which said alkali metal acetate is sodium diacetate and said germicide is a quaternary ammonium chloride compound.

10. The pharmaceutical composition of claim 8 in which said alkali metal acetate is sodium diacetate and said germicide is a phenylmercuric salt.

11. The pharmaceutical composition of claim 8 in which said alkali metal acetate is sodium diacetate and said germicide is (di-isobutyl-phenoxy ethoxyethyl) dimethyl benzyl ammonium chloride monohydrate.

References Cited in the file of this patent

UNITED STATES PATENTS

| 2,086,499 | Hennig     | July 6, 1937  |
| 2,306,826 | Mendelsohn | Dec. 29, 1942 |

FOREIGN PATENTS

| 94,851 | Germany | Oct. 30, 1897 |

OTHER REFERENCES

Pharmaceutical Formulas, vol. I, 12th ed., 1953, Chemist and Druggist, London, p. 395.

New and Nonofficial Remedies, 1954, J. P. Lippincott, Philadelphia, Pa., pp. 68–70, 82 and 83.